Patented Mar. 24, 1936

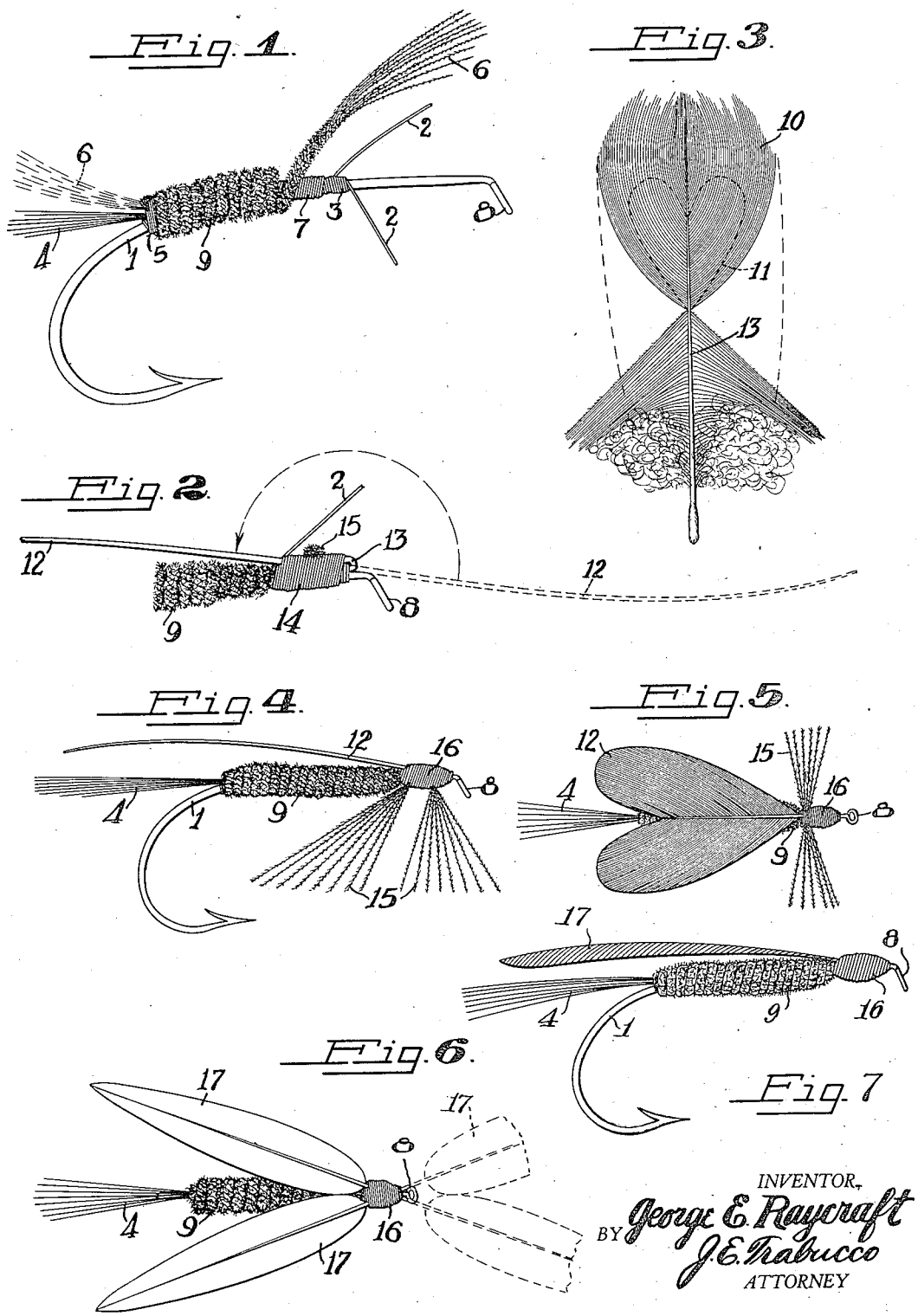

2,034,832

UNITED STATES PATENT OFFICE 2,034,832

FISH LURE

George E. Raycraft, San Francisco, Calif.

Application December 20, 1933, Serial No. 703,188

12 Claims. (Cl. 43—48)

This invention relates to improvements in fish lure of the kind adapted for use in trout fishing.

An object of my invention is to provide an improved and novel type of fish lure for use in fishing for trout or other game fish, embodying a construction which simulates a winged insect.

A further object of my invention is to provide an improved trout fly embodying a construction closely simulating a winged insect, in which the two wings are positioned in approximately the same plane and extend rearwardly from the head portion in spaced but adjacent relationship to the body portion.

Another object of my invention is to provide a novel and improved method of making fish lure of the trout fly variety.

Other objects more or less apparent will present themselves or will be specifically pointed out in the description to follow.

In the accompanying drawing:

Fig. 1 is a side elevation of a hook, showing my improved fish lure in its early stages of construction, with the feathered body portion partly applied to the shank of the hook;

Fig. 2 is a fragmentary part of the hook showing the body and wing portions applied thereto, the dotted lines indicating the position of the wing portion before it is bent back and tied in its permanent position to the body portion;

Fig. 3 is a plan view showing the manner in which the barbs of a feather are separated prior to the cutting of the wings therefrom, the inner dotted lines indicating the outline of the wings, and the outer dotted lines indicating the normal outline of the feather before the barbs are separated;

Fig. 4 is a side elevation of a completed trout fly embodying one form my invention may assume;

Fig. 5 is a plan view of the same; and

Fig. 6 is a plan view of another type of trout fly embodying my invention, showing by the dotted lines, the positions of the two feathers before being bent back to form the wings.

Fig. 7 is a side elevation of the trout fly shown in Fig. 6.

In constructing my improved fish lure I first select a fish hook 1 of suitable size and shape and apply a composition of lacquer and cement thereto. Around the shank of the fish hook, commencing at a point near the forward end thereof and ending at a point toward its rear end, I wind a suitable thread 2 so as to provide a tightly wound layer 3. Upon the rear end of the layer 3 I place a tail piece 4 which is preferably made up of a number of selected barbs of a suitably colored feather. The tail piece projects to the rear of the hook's shank and is secured in place by a number of windings 5 of the thread 2. A number of elongated barbs 6, preferably selected from the feathers of a water fowl, are grouped together and affixed to the shank of the fish hook by a winding 7 of the thread 2. The barbs 6, before being wound around the shank, project rearwardly as indicated by the dotted lines in Fig. 1. So as to roughen the short hair like projections of the barbs, I grasp their free projecting ends and move my fingers in a forward direction toward their tied ends. The barbs 6 are then twisted and wound in a forward direction around the shank to a point adjacent but to the rear of the eye 8 of the fish hook. The twisted and roughened barbs 6 when wound around the shank of the hook and tied at their forward ends by a winding of the thread 2, constitute a fuzzy body portion 9 of the artificial fly. The roughened and twisted barbs of the body portion 9 being waterproof, form a large number of air pockets which give an iridescent appearance to the said body when the device is in the water.

I next select a properly colored feather 10 from the side plumage of a water fowl and treat the same with a suitable composition, such as lacquer and cement so as to normally keep its barbs together and to give it a greater amount of rigidity and durability. As indicated in Fig. 3 by the heart shaped dotted lines 11, the feather 10 may be cut in the proper shape by a die or other suitable means so as to form the two wings 12 of the artificial fly. After the feather 10 has been cut to form the wings 12, the barbs which were previously separated from and bent downwardly away from those barbs from which the wings are formed, are stripped from the shaft 13 of the feather. As illustrated in Fig. 2 the shaft 13 of the feather is tied by the thread 2 to the forward end of the hook shank with the wings 12 extending in a forward direction as indicated by the dotted lines. After properly tying the shaft 13 of the feather, the wings as a unit are bent backwardly, as indicated by the arrow, until the latter overlie the body 9 and are positioned in spaced relation thereto. The thread 2 as at 14 is thereupon wrapped toward the rear around the bent over shaft 13 to a point thereon where the barbs of the wing 12 commence. The wings 12 normally lie in approximately the same plane and assume slightly inclined positions with respect to the body portion 9.

The legs 15 of the artificial fly are made from a number of roughened barbs taken from selected feathers of a duck or other water fowl. The barbs forming the legs 15 are secured by the thread 2 to the forward end of the shank of the hook at points where the wrapping 14 occurs and are thereafter cut to a desirable length. The barbs forming the legs 15 may be divided into two groups by a figure 8 knot with one group being positioned at any suitable angle with respect to the other groups. The thread 2 is wound around the forward end of the shank of the hook 1 from a point where the wings 12 commence to a point near the eye 8, thereby forming a bulged part which constitutes the head 16 of the artificial fly. After the head 16 is formed a water proof varnish is applied thereto, some of which adheres to the legs 15 and causes them to be held in a somewhat rigid position when the device is being used. In actual practice the curved and hooked end of the fish hook, being heavier than the body portion 9, is normally positioned beneath the wings 12, thereby causing the artificial fly to accume a natural position in the water with the wings somewhat horizontally disposed.

As illustrated in Fig. 6 the wings 17 of my improved fly may be made from two elongated and narrow feathers which, as previously described, are bent back from the dotted positions and so tied that they permanently assume angular positions with respect to one another and lie substantially in a common plane. The two feathers comprising the wings 17 are preferably selected from the concave edge feathers coming from the wings of such water fowl as duck, geese or brant.

The types of fish lure just described are what are known as dry flies; they shed water, do not absorb moisture and normally float upon the surface of the water. Wet flies may be made in accordance with my invention by having the body portion made from material which does not repel water, such as, cotton, fur, tinsel and hair.

It is apparent to those skilled in the art that my invention is susceptible to numerous modifications and changes in regard to form, shape and minor details of construction. It therefore is to be understood that the appended claims are to determine the scope of my invention rather than the exact disclosures made by the drawing and specification.

Having described my invention what I claim is:

1. A fish lure of the character described comprising a hook, a body portion secured to the hook's shank, and a pair of integrally joined wings made from a single feather having a shaft, the shaft of the feather being secured to the forward end of the hook's shank, with the wings extending rearwardly alongside the body portion.

2. A fish lure of the character described comprising a hook, a body portion secured around the shank of the hook, and a wing structure secured to the shank and overlying the body portion and disposed at an angle thereto, the said wing structure consisting of a pair of integrally joined wings formed from a single feather and lying in approximately the same plane.

3. A fish lure of the character described comprising a hook, a body portion secured around the shank of the hook, and a wing structure secured to the front end of the shank, the said wing structure overlying the body portion and disposed at an angle and consisting of an integrally joined pair of wings which are made from a single feather and are generally heart shaped in outline.

4. A fish lure of the character described comprising a hook, a body portion secured around the shank of the hook, a wing structure secured to the front end of the shank and extending rearwardly in spaced relation to the body portion, the said wing structure being disposed at an angle to the body portion and formed from a single feather, the feather's shaft being secured to the shank and the barbs of the feather on each side of the shaft constituting duplicate wings.

5. In a fish lure, a hook, and a wing structure secured to the shank of the hook, the said wing structure comprising duplicate and integrally joined wings lying in approximately the same plane which is disposed at an angle to the shank.

6. In a fish lure, a hook, and a wing structure secured to the shank of the hook, the wing structure consisting of duplicate wings positioned at angles to one another with their forward ends converging and secured to the forward end of the shank of the hook, the said wings lying substantially in a common plane which is disposed at an angle to the shank.

7. In a fish lure, a hook, a body portion extending around the shank of the hook, a wing structure consisting of duplicate wings lying substantially in a common plane and positioned at angles to one another with their forward ends converging and secured to the forward end of the shank of the hook, the said wings being disposed in a plane extending at an angle to and above the shank of the hook.

8. A fish lure comprising a hook, a body portion secured around the shank of the hook, the said body portion consisting of a number of roughened and twisted barbs of one or more feathers from a water fowl, and a wing structure secured to the shank of the hook.

9. A fish lure comprising a hook, a body portion wound around the shank of the hook, the said body portion consisting of a number of roughened and twisted barbs of one or more feathers from a water fowl, and a wing structure secured to the shank of the hook and overlying the body portion.

10. A dry fly fish lure comprising a hook, a body portion extending around the shank of the hook, the said body portion consisting of a number of barbs from the feather of a water fowl, and a feathered wing structure secured to the front end of the shank and extending rearwardly in spaced relation to the body portion, the said wing structure consisting of duplicate wing members joined together and lying substantially in a common plane, the said plane being disposed at an angle to the shank.

11. A fish lure of the kind described comprising a hook, a body portion extending around the shank of the hook, a head portion secured to the shank in front of the body portion, a plurality of leg members secured to the head portion and extending outwardly at angles to one another, and a wing structure secured to the shank at points adjacent the head portion, the said wing structure consisting of substantially duplicate wing members which are positioned at angles to one another with their forward ends converging, the said duplicate wings lying in a common plane which is disposed at an angle to and above the shank of the hook.

12. A fish lure of the kind described comprising a hook, a body portion extending around the shank of the hook, a head portion secured to the shank in front of the body portion, a plurality of leg members secured to the head portion and extending outwardly at angles to one another, and a wing structure secured to the shank at points adjacent the head portion, the said wing structure overlying the body portion and consisting of an integrally joined pair of wing members lying in substantially the same plane which is positioned at an angle to the body portion, the wings being formed from a single feather.

GEORGE E. RAYCRAFT.